(12) United States Patent
Sullivan et al.

(10) Patent No.: US 8,928,674 B1
(45) Date of Patent: *Jan. 6, 2015

(54) COMBINING MULTIPLE SESSION CONTENT FOR ANIMATION LIBRARIES

(75) Inventors: Steve Sullivan, San Francisco, CA (US); Francesco G. Callari, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/491,977

(22) Filed: Jun. 8, 2012

Related U.S. Application Data

(63) Continuation of application No. 11/735,291, filed on Apr. 13, 2007, now Pat. No. 8,199,152, which is a continuation-in-part of application No. 11/623,707, filed on Jan. 16, 2007, now Pat. No. 8,542,236.

(51) Int. Cl.
*G06T 13/00* (2011.01)
(52) U.S. Cl.
USPC .......................................... 345/474; 345/473
(58) Field of Classification Search
None
See application file for complete search history.

(56) References Cited

U.S. PATENT DOCUMENTS

| | | | |
|---|---|---|---|
| 5,790,124 A | 8/1998 | Fischer et al. |
| 5,831,260 A | 11/1998 | Hansen |
| 5,932,417 A | 8/1999 | Birnbaumer et al. |
| 6,072,496 A | 6/2000 | Guenter et al. |
| 6,115,052 A | 9/2000 | Freeman et al. |
| 6,166,811 A | 12/2000 | Long et al. |
| 6,208,348 B1 | 3/2001 | Kaye |
| 6,324,296 B1 | 11/2001 | McSheery et al. |
| 6,353,422 B1 | 3/2002 | Perlman |
| 6,438,255 B1 | 8/2002 | Lesniak |
| 6,515,659 B1 | 2/2003 | Kaye et al. |
| 6,522,332 B1 | 2/2003 | Laneiault et al. |
| 6,606,095 B1 | 8/2003 | Lengyel et al. |
| 6,614,407 B2 | 9/2003 | Perlman |
| 6,614,428 B1 | 9/2003 | Lengyel |
| 6,633,294 B1 | 10/2003 | Rosenthal et al. |
| 6,686,926 B1 | 2/2004 | Kaye |
| 6,919,892 B1 | 7/2005 | Cheiky et al. |
| 6,977,630 B1 | 12/2005 | Donath et al. |
| 7,027,054 B1 | 4/2006 | Cheiky et al. |
| 7,035,436 B2 | 4/2006 | Nakamura et al. |

(Continued)

FOREIGN PATENT DOCUMENTS

| | | |
|---|---|---|
| EP | 1946243 | 7/2008 |
| JP | 09-084691 | 9/1998 |
| WO | WO2004/041379 | 5/2004 |

OTHER PUBLICATIONS

Heck, R., Kovar, L. and Gleicher, M. (2006), Splicing Upper-Body Actions with Locomotion. Computer Graphics Forum, 25: 459-466.*

(Continued)

*Primary Examiner* — Daniel Hajnik
(74) *Attorney, Agent, or Firm* — Kilpatrick Townsend & Stockton LLP

(57) ABSTRACT

A computer-implemented method includes comparing content captured during one session and content captured during another session. A surface feature of an object represented in the content of one session corresponds to a surface feature of an object represented in the content of the other session. The method also includes substantially aligning the surface features of the sessions and combining the aligned content.

42 Claims, 10 Drawing Sheets

(56) References Cited

U.S. PATENT DOCUMENTS

| | | | |
|---|---|---|---|
| 7,098,920 | B2 | 8/2006 | Marschner et al. |
| 7,102,633 | B2 | 9/2006 | Kaye et al. |
| 7,116,323 | B2 | 10/2006 | Kaye et al. |
| 7,116,324 | B2 | 10/2006 | Kaye et al. |
| 7,129,949 | B2 | 10/2006 | Marschner et al. |
| 7,164,718 | B2 | 1/2007 | Maziere et al. |
| 7,184,047 | B1 | 2/2007 | Crampton |
| 7,212,656 | B2 | 5/2007 | Liu et al. |
| 7,292,261 | B1 | 11/2007 | Teo |
| 7,433,807 | B2 | 10/2008 | Marschner et al. |
| 7,450,126 | B2 | 11/2008 | Marschner et al. |
| 7,535,472 | B2 | 5/2009 | Kim et al. |
| 7,554,549 | B2 | 6/2009 | Sagar et al. |
| 7,605,861 | B2 | 10/2009 | LaSalle et al. |
| 7,848,564 | B2 | 12/2010 | Sullivan et al. |
| 8,013,853 | B1 * | 9/2011 | Douglas et al. ............ 345/420 |
| 8,019,137 | B2 | 9/2011 | Sullivan et al. |
| 8,130,225 | B2 | 3/2012 | Sullivan et al. |
| 8,144,153 | B1 | 3/2012 | Sullivan et al. |
| 2001/0024512 | A1 | 9/2001 | Yoronka et al. |
| 2001/0033675 | A1 | 10/2001 | Maurer et al. |
| 2002/0041285 | A1 | 4/2002 | Hunter et al. |
| 2002/0060649 | A1 | 5/2002 | Perlman |
| 2004/0063481 | A1 | 4/2004 | Wang |
| 2004/0119716 | A1 | 6/2004 | Park et al. |
| 2004/0155962 | A1 | 8/2004 | Marks |
| 2004/0161132 | A1 | 8/2004 | Cohen et al. |
| 2004/0179008 | A1 | 9/2004 | Gordon et al. |
| 2005/0078124 | A1 | 4/2005 | Liu et al. |
| 2005/0099414 | A1 | 5/2005 | Kaye et al. |
| 2005/0104878 | A1 | 5/2005 | Kay et al. |
| 2005/0104879 | A1 | 5/2005 | Kay et al. |
| 2005/0146521 | A1 | 7/2005 | Kaye et al. |
| 2005/0231505 | A1 | 10/2005 | Kaye et al. |
| 2006/0055699 | A1 | 3/2006 | Perlman et al. |
| 2006/0055706 | A1 | 3/2006 | Perlman et al. |
| 2006/0067573 | A1 | 3/2006 | Parr et al. |
| 2006/0126928 | A1 | 6/2006 | Edwards et al. |
| 2006/0157640 | A1 | 7/2006 | Perlman et al. |
| 2006/0192785 | A1 | 8/2006 | Marschner et al. |
| 2006/0192854 | A1 | 8/2006 | Perlman et al. |
| 2006/0228101 | A1 | 10/2006 | Sullivan et al. |
| 2007/0052711 | A1 | 3/2007 | Gordon et al. |
| 2007/0091178 | A1 | 4/2007 | Cotter et al. |
| 2007/0133841 | A1 | 6/2007 | Zhang et al. |
| 2008/0100622 | A1 | 5/2008 | Gordon |
| 2008/0170077 | A1 | 7/2008 | Sullivan et al. |
| 2008/0170078 | A1 | 7/2008 | Sullivan et al. |
| 2008/0170777 | A1 | 7/2008 | Sullivan et al. |
| 2008/0180448 | A1 | 7/2008 | Anguelov et al. |
| 2009/0209343 | A1 | 8/2009 | Foxlin et al. |
| 2010/0002934 | A1 | 1/2010 | Sullivan et al. |
| 2010/0164862 | A1 | 7/2010 | Sullivan et al. |

OTHER PUBLICATIONS

Kwon, Taesoo, and Sung Yong Shin. "Motion modeling for on-line locomotion synthesis." Proceedings of the 2005 ACM SIGGRAPH/ Eurographics symposium on Computer animation. ACM, 2005.*

Agarwala, Aseem, "Keyframe-Based Tracking for Rotoscoping and Animation," ACM SIGGRAPH '04 conference proceedings, 2004, pp. 1-8.

Anguelov, Dragomir et al., "SCAPE: Shape Completion and Animation of People." 2005, ACM Inc., pp. 408-416.

Bascle, Blake, "Separability of pose and expression in facial tracking and animation," Jan. 1998, IEEE Computer Society, Proceedings of the Sixth International Conference on Computer Vision, pp. 323-328.

Bespalov, Dmitriy et al., "Local Feature Extraction and Matching Partial Objects." Drexel University, Aug. 6, 2006, pp. 1-30.

Buenaposada, Jose M., "Performance driven facial animation using illumination independent appearance-based tracking," In Proceedings of ICPR, Hong Kong, Aug. 2006, 4 pages.

Chang et al., "Automatic 3D Facial Expression in Analysis in Videos," Proc. IEEE Int'l Workshop Analysis and Modeling of Faces and Gestures (AMFG '05), vol. 3723, pp. 293-307, 2005.

Curio, Cristóbal et al., "Semantic 3D Motion Retargeting for Facial Animation." ACM Jul. 28-29, 2006, pp. 77-84, 176.

Debevec, et al. "Acquiring the Reflectance Field of a Human Face", SIGGRAPH 2000 Conference Proceedings, pp. 1-12, 2000.

Deng et al., "Animating blendshape faces by cross-mapping motion capture data," In Proceedings of the 2006 Symposium on Interactive 3D Graphics and Games (Redwood City, California, Mar. 14-17, 2006). I3D '06. ACM, New York, NY, 7 pages.

Examination Report from European Patent Office for Application No. GB0718003.7, dated Aug. 3, 2009, 2 pages.

Examination Report from New Zealand Patent Office for Application No. 561570, dated Jul. 7, 2009, 2 pages.

Examination Report from New Zealand Patent Office for Application No. 561570, dated Dec. 18, 2009, 1 page.

Examination Report from New Zealand Patent Office for Application No. 581496, dated Dec. 2, 2009, 2 pages.

Examination Report from New Zealand Patent Office for Application No. 582356, dated Jan. 7, 2010, 2 pages.

Furukawa et al., "Dense 3D Motion Capture from Synchronized Video Streams," [online], [retrieved on Aug. 26, 2009]. Retrieved from the Internet <URL: http://www.cs.washington.edu/homes/furukawa/papers/cvpr08b.pdf>, 8 pages.

Gleicher, Michael, "Animation From Observation: Motion Capture and Motion Editing," Computer Graphics 33(4), 1999, pp. 1-5.

Grung and Manne, "Missing values in principal component analysis," Chimometrics and Intelligent Laboratory Systems, 1998, 42:125-139.

Heap and Hogg, "Towards 3D Hand Tracking using a Deformable Model," Proceedings of the Second International Conference on Automatic Face and Gesture Recognition, 1996, pp. 140-145.

Herda et al., "Skeleton-Based Motion Capture for Robust Reconstruction of Human Motion," Computer Animation 2000 Proceedings, 2000, pp. 77-83.

Heseltine, Thomas et al., "Three-Dimensional Face Recognition an Eigensurface Approach." 2004 International Conference on Image Processing (ICIP), pp. 1421-1424.

Horprasert et al., "Real-time 3D Motion Capture," Second workshop on Perceptual Interfaces, San Francisco, Nov. 1998, 4 pages.

International Preliminary Report on Patentability for PCT Application No. PCT/US2006/009787, dated Nov. 13, 2007, 9 pages.

International Search Report and Written Opinion for PCT Application No. PCT/US2006/009787, dated Oct. 29, 2007, 12 pages.

Lin et al., "Extracting 3D Facial Animation Parameters from Multiview Video Clips," IEEE Computer Graphics and Applications, 2002, 22(6):72-80.

Majkowska, A. et al., "Automatic splicing for hand and body animations." 2006. In Proceedings if the 2006 ACM SIGGRAPH/ Eurographics symposium on Computer animation (SCA '06). Eurographics Associate, Aire-la-Ville, Switzerland, Switzerland, pp. 309-316 and 369.

Markoff, "Camera System Creates Sophisticated 3-D Effects" [online], New York Times, Jul. 31, 2006, [retrieved on Jul. 31, 2006]. Retrieved from the Internet: <URL: www.nytimes.com/2006/0731/technology/31motion.html >, 4 pages.

Natu, Examination Report in Australian Patent Application No. 2009240847, Mar. 11, 2011, 3 pages.

Park, S. et al., "Capturing and Animating Skin Deformation in Human Motion." ACM 2006, pp. 881-889.

Parke, F., "Computer Generated Animation of Faces," Aug. 1972, SIGGRAPH 1972, pp. 451-457.

Preteux, Francoise et al., "Model-Based Head Tracking and 3D Pose Estimation." Sep. 24, 1998, Institut National des Telecommunications, 15 pages.

Search Report from United Kingdom Intellectual Property Office for application No. GB0922650.7, dated Apr. 20, 2010, 2 pages.

Stopford, Office Action issued in AU application No. 2009240847 mailed Nov. 23, 2011, 4 pages.

Wren et al, "Dynamic Models of Human Motion," [online], 1998, [retrieved on Aug. 26, 2009]. Retrieved from the Intern et <URL: http://www.drwren.com/chris/dyna/TR-415.pdf>, 6 pages.

Zhang, Qingshan, et al., "Geometry-Driven Photorealistic Facial Expression Synthesis," IEEE Transactions on Visualization and Computer Graphics, vol. 12, No. 1, Jan./Feb. 2006, pp. 48-60.

* cited by examiner

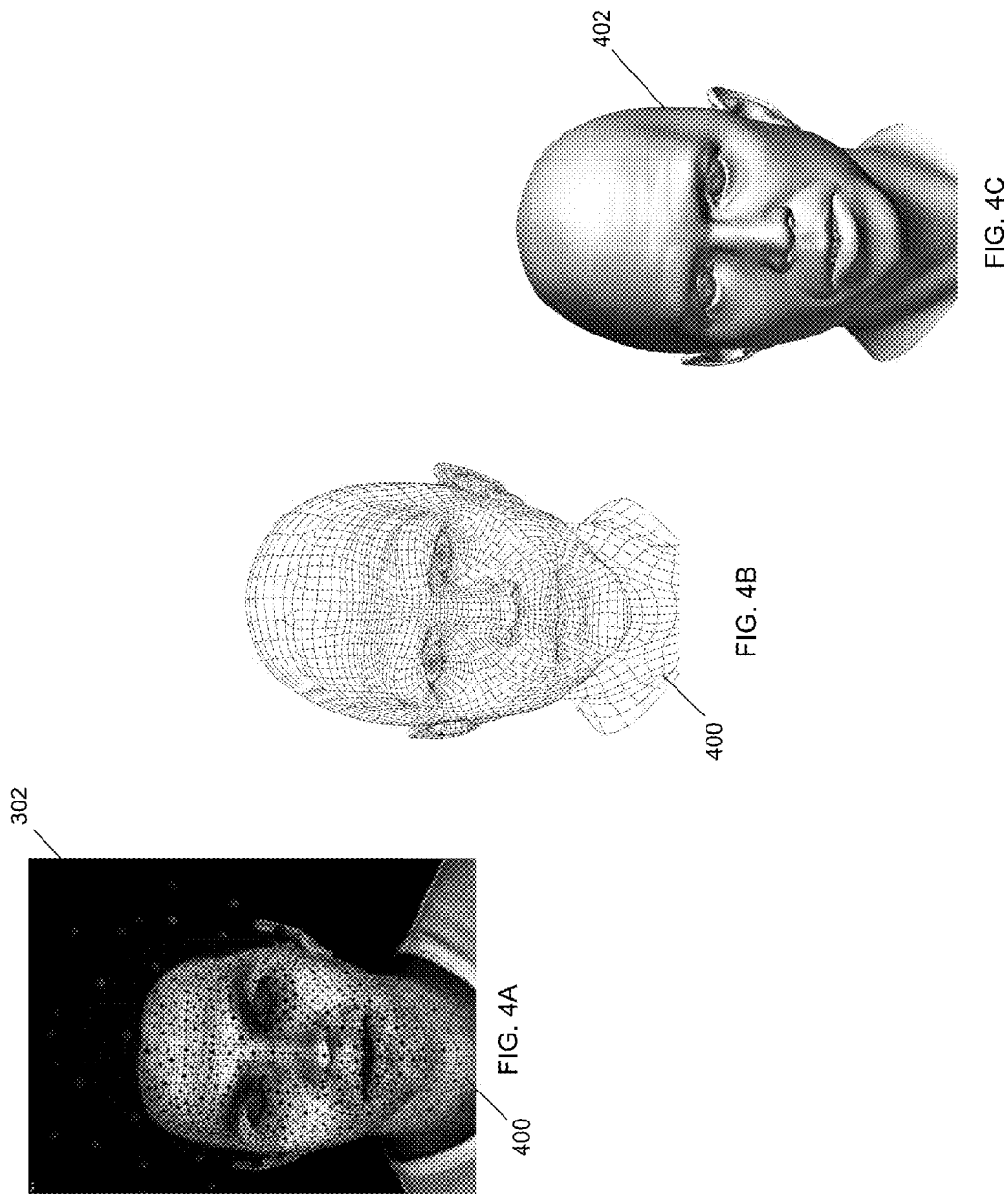

US 8,928,674 B1

COMBINING MULTIPLE SESSION CONTENT FOR ANIMATION LIBRARIES

RELATED APPLICATION

This application is a continuation application and claims priority under 35 U.S.C. §120 to U.S. patent application Ser. No. 11/735,291, filed Apr. 13, 2007 (U.S. Pat. No. 8,199,152 to be issued on Jun. 12, 2012), which is a continuation-in-part and claims priority to U.S. application Ser. No. 11/623,707, filed Jan. 16, 2007. The disclosure of each of these prior applications is considered part of and is incorporated by reference in the disclosure of this application.

TECHNICAL FIELD

This document relates to producing animation libraries from content collected over multiple image capture sessions.

BACKGROUND

Computer-based animation techniques often involve capturing a series of images of an actor (or other object) with multiple cameras each of which has a different viewing perspective. The cameras are synchronized such that for one instant in time, each camera captures an image. These images are then combined to generate a three-dimensional (3D) graphical representation of the actor. By repetitively capturing images over a period of time, a series of 3D representations may be produced that illustrate the actor's motion (e.g., body movements, facial expressions, etc.).

To produce an animation that tracks the actor's motion, a digital mesh may be generated from the captured data to represent the position of the actor for each time instance. For example, a series of digital meshes may represent an actor's face for tracking facial expressions. To define mesh vertices, markers (e.g., make-up dots) that contrast with the actor's skin tone may be applied to the actor's face to provide distinct points and highlight facial features. Along with application of the markers being time consuming, for continuity, the images of the actor's performance may be captured during a single session.

SUMMARY

In one implementation, images of an actor's performance are captured over multiple sessions and content of the images from the multiple sessions is combined. For each session, markers may be applied to the actor in nearly equivalent locations for continuity. However, by comparing content from different sessions, content may be aligned and equivalent marker placement is not required. Once combined, the content of the multiple sessions may be used to produce a model for animating the actor's performance. For example, a model produced from multiple session content may be used for animating an actor's facial expressions or other types of performance mannerism, characteristics or motion.

In one aspect, a computer-implemented method includes comparing content captured during one session and content captured during another session. A surface feature of an object represented in the content of one session corresponds to a surface feature of an object represented in the content of the other session. The method also includes substantially aligning the surface features of the sessions and combining the aligned content.

Implementations may include any or all of the following features. Substantially aligning the surface features may include adjusting the content of one session, for example, the content captured first or the content captured second may be adjusted for alignment. The method may further include decomposing the combined content, such as by linearly transforming the combined content, computing principle components, or other similar technique or methodology. The session content may be represented by an animation mesh (or other type of mesh), an image, or other type of content. Surface features may be artificial such as markers applied to an object or natural such as contours on an object. The object may be a deformable object, such as an actor's face.

In another aspect, a system includes a session combiner that compares content captured during one session and content captured during another session. A surface feature of an object represented in the content of one session corresponds to a surface feature of an object represented in the content of the other session. The session combiner also substantially aligns the surface features of the sessions and combines the aligned content.

In still another aspect, a computer program product tangibly embodied in an information carrier and comprises instructions that when executed by a processor perform a method that includes comparing content captured during one session and content captured during another session. A surface feature of an object represented in the content of one session corresponds to a surface feature of an object represented in the content of the other session. The method also includes substantially aligning the surface features of the sessions and combining the aligned content.

In still another aspect, a motion capture system includes one or more devices for capturing one or more images of an object. The system also includes a computer system to execute one of more processes to compare content captured during one session and content captured by one device during another session. A surface feature of an object represented in the content of one session corresponds to a surface feature of an object represented in the content of the other session. The executed process or processes also substantially align the surface features of the sessions and combine the aligned content.

The details of one or more implementations are set forth in the accompanying drawings and the description below. Other features and advantages will be apparent from the description and drawings, and from the claims.

DESCRIPTION OF DRAWINGS

FIG. 4A-C includes an animation mesh overlaying a captured image, the animation mesh and a rendering of the animation mesh.

Like reference symbols in the various drawings indicate like elements.

DETAILED DESCRIPTION

Figure 1:
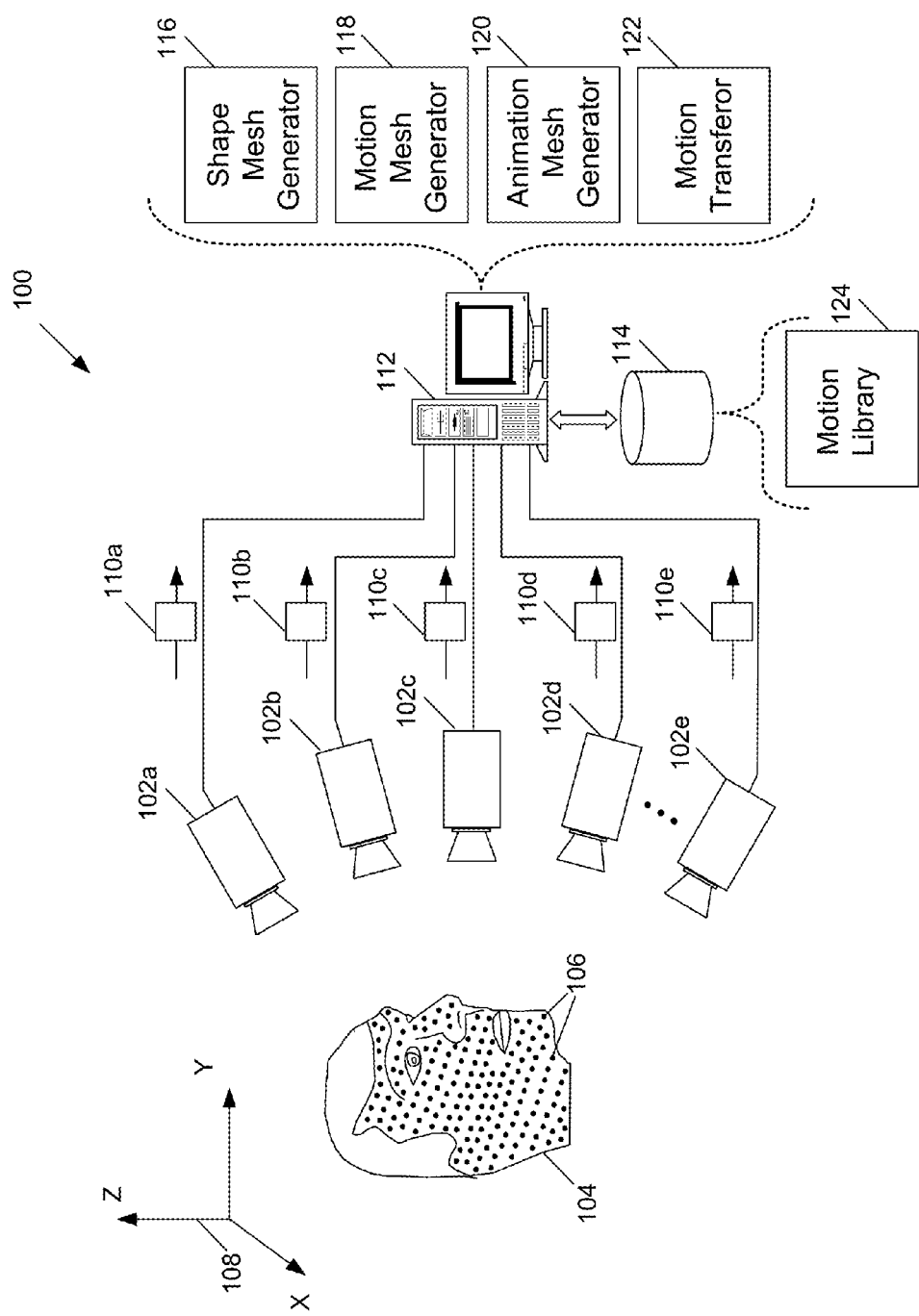
FIG. 1 is a diagram of an exemplary motion capture system.

Referring to FIG. 1, a motion capture system 100 includes a group of cameras 102a-e that are capable of capturing images of an actor's face 104 or other type of deformable object. To highlight facial features, a series of markers 106 (e.g., makeup dots) are applied to the actor's face 104. Dependent upon lighting conditions and the facial expressions to be captured, the markers 106 may be distributed in various patterns. For example, the markers may be uniformly distributed across the face 104 or some of the markers may be concentrated in particular areas (e.g., corners of the mouth) that tend to deform with detailed shapes for many facial expressions. Along with artificial highlight points (e.g., markers 106), natural points of the actor's face 104 may be used to represent facial surface features. For example, the texture of the actor's face may provide distinct features. Contours, curves, or other similar types of shapes in an actor's face may also represent facial features. For example, the contour of a lip, the curve of an eyebrow or other portions of an actor's face may represent useful features.

The cameras 102a-e are temporally synchronized such that each captures an image at approximately the same time instant. Additionally, the cameras 102a-e are spatially positioned (in know locations) such that each camera provides a different aspect view of the actor's face 104. In this illustration, the cameras are arranged along one axis (e.g., the "Z" axis of a coordinate system 108), however, the cameras could also be distributed along another axis (e.g., the "X" axis or the "Y" axis) or arranged in any other position in three dimensional space that may be represented by the coordinate system 108. Furthermore, while cameras 102a-e typically capture optical images, in some arrangements the cameras may be capable of capturing infrared images or images in other portions of the electromagnetic spectrum. Thereby, along with optical cameras, infrared cameras, other types of image capture devices may be implemented in the motion capture system 100. Cameras designed for collecting particular types of information may also be implemented such as cameras designed for capturing depth information, contrast information, or the like. Image capturing devices may also be combined to provide information such as depth information. For example, two or more cameras may be bundled together to form an image collection device to capture depth information.

As illustrated in the figure, each camera 102a-e is capable of respectively capturing and providing an image 110a-e to a computer system 112 (or other type of computing device) for cataloging the captured facial expressions and applying facial expressions to animated objects. Various image formats (e.g., jpeg, etc.) and protocols may be used and complied with to transfer the images to the computer system 112. Additionally, the computer system 112 may convert the images into one or more other formats. Along with components (e.g., interface cards, etc.) for receiving the images and communicating with the cameras 102a-e, the computer system 112 also include memory (not shown) and one or more processors (also not shown) to execute processing operations. A storage device 114 (e.g., a hard drive, a CD-ROM, a Redundant Array of Independent Disks (RAID) drive, etc.) is in communication with the computer system 112 and is capable of storing the captured images along with generated meshes, rendered animation, and other types of information (e.g., motion information) and processed data.

To process the received camera images 110a-e (along with exchanging associated commands and data), an shape mesh generator 116 is executed by the computer system 112. The shape mesh generator 116 combines the cameras images 110a-e into a three-dimensional (3D) shape mesh (for that capture time instance) by using stereo reconstruction or other similar methodology. The shape mesh has a relatively high resolution and provides the 3D shape of the captured object (e.g., actor's face 104). For a series of time instances, the shape mesh generator 116 can produce corresponding shape meshes that match the movement of the actor's face 104.

A motion mesh generator 118 is also executed by the computer system 112 to produce relatively lower resolution meshes that represent the position of the markers as provided by images 100a-e. As described in detail below, these meshes (referred to as motion meshes) track the movement of the markers 106 as the actor performs. For example, the actor may produce a series of facial expressions that are captured by the cameras 102a-e over a series of sequential images. The actor may also provide facial expressions by delivering dialogue (e.g., reading from a script) or performing other actions associated with his character role. For each facial expression and while transitioning between expressions, the markers 106 may change position. By capturing this motion information, the facial expressions may be used to animate a computer-generated character. However, the resolution of the motion meshes is dependent upon the number of markers applied to the actor's face and the image capture conditions (e.g., lighting), for example. Similarly, shape meshes may be produced by the shape mesh generator 116 that represent the shape of the facial expressions over the actor's performance.

To produce an animated character, an animation mesh generator 120 generates a mesh (referred to as an animation mesh) that represents the three-dimensional shape of the actor's face (or a character's face) and is suitable for animation. Motion information is transferred to the animation mesh from the motion meshes (generated by the motion mesh generator 118) and the shape meshes (generated by the shape mesh generator 116). This animation mesh may be produced from one or more types of information such as the camera images 110a-e. User input may also be used to produce the animation mesh. For example, the animation mesh may be produced by an artist independent of the animation mesh generator 120, or in concert with the animation mesh generator.

In this implementation, to animate the character, a motion transferor 122 incorporates motion from the motion meshes and the shape meshes into the animation mesh. Thereby, motion information is provided to a high resolution mesh (i.e., the animation mesh) by a relatively lower resolution mesh (i.e., the motion mesh). Additionally, shape information from the shape mesh may be used to constrain the motion of the animation mesh. Thus, a high resolution animation mesh may be animated from less motion information (compared to applying additional markers to the actors face to produce a series of higher resolution motion meshes). As such, a session may be held with an actor in which camera images are captures under fairly controlled conditions. From this training session data, the motion capture system 100 may become familiar with the general movements and facial expressions of the actor (via the generated motion meshes and shape meshes).

By storing the animation mesh with the incorporated motion (constrained by the shape information) in the storage device 114, the data may be retrieved for use at a later time. For example, the stored mesh may be retrieved to incorporate one or more of the actor's facial expressions into an animation. The stored motion information may also be processed (e.g., combined with other motion information, applied with weighting factors, etc.) to produce new facial expressions that may be applied to an animated character (along with being stored in the storage device 114).

The motion transferor 122 may also be capable of processing the animation meshes and motion information for efficient storage and reuse. For example, as described below, the motion transferor 122 may decompose the motion information. Techniques such as Principle Component Analysis (PCA) or other types of linear decomposition may be implemented. Generally, PCA is an analysis methodology that identifies patterns in data and produces principle components that highlight data similarities and differences. By identifying the patterns, data may be compressed (e.g., dimensionality reduced) without much information loss. Along with conserving storage space, the principle components may be retrieved to animate one or more animation meshes. For example, by combining principle components and/or applying weighting factors, the stored principle components may be used to generate motion information that represent other facial expressions. Thus, a series of actor facial expressions may be captured by the cameras 102*a-e* to form a motion library 124 that is stored in the storage device 114. The motion library 124 may use one or more types of data storage methodologies and structures to provide a storage system that conserves capacity while providing reliable accessibility.

To render the animation meshes (e.g., using motion information from the motion library 124) into animations, one or more processes may also executed by the computer system 112 or another computing device. By using the animation meshes and the motion information produced by the motion transferor 122, the facial expressions and likeness of the actor may be incorporated into an animated character or other type of graphical object. Similar to the animation meshes, once rendered, the animated character or graphical object may be stored in the storage device 124 for later retrieval.

In this exemplary motion capture system 100, the shape mesh generator 116, the motion mesh generator 118, the animation mesh generator 120 and the motion transferor 122 are separate entities (e.g., applications, processes, routines, etc.) that may be independently executed, however, in some implementations, the functionality of two or more of these entities may be combined and executed together.

Figure 2:
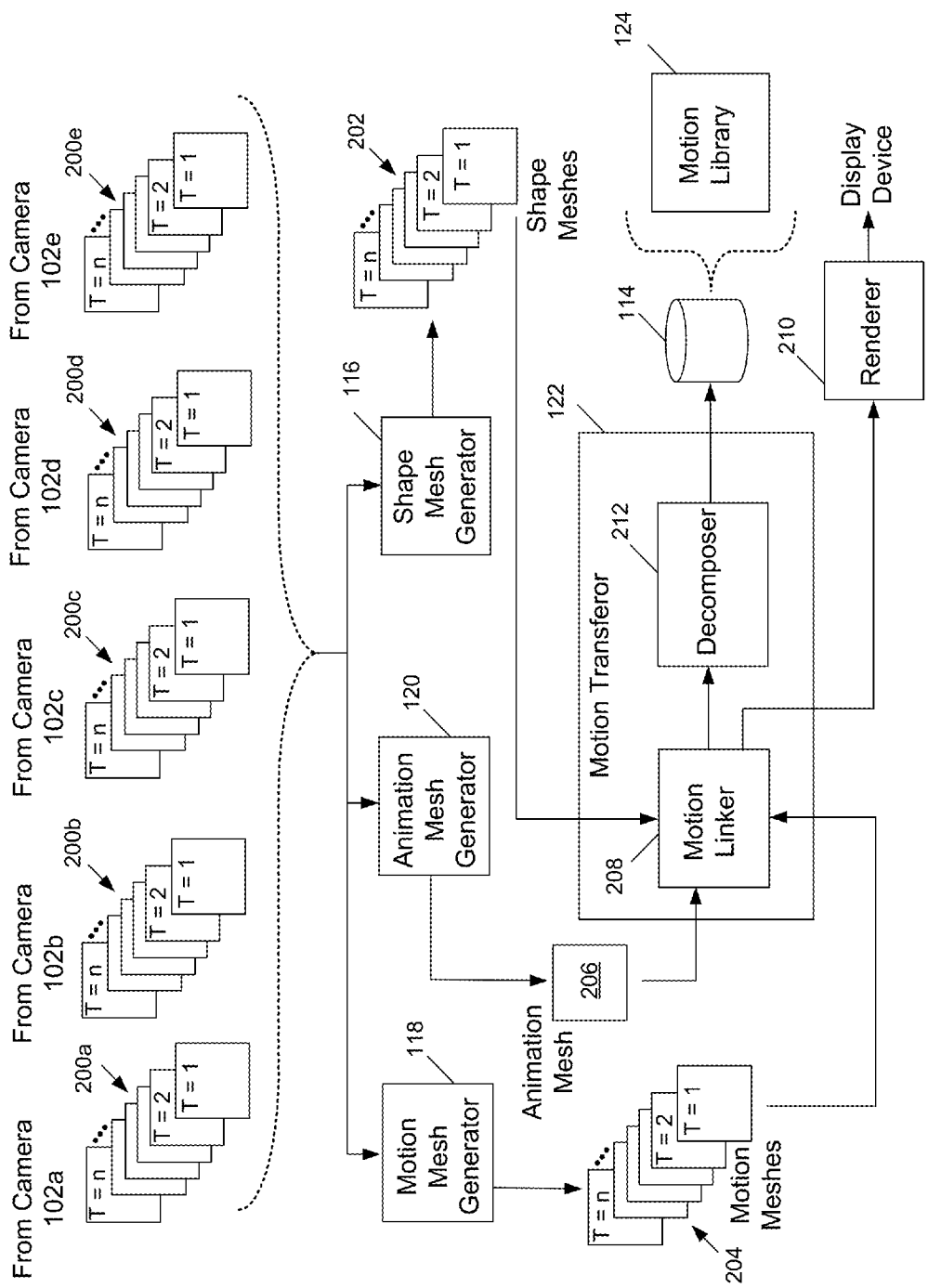
FIG. 2 is a diagram that illustrates mesh production by the motion capture system.
Figure 3A:
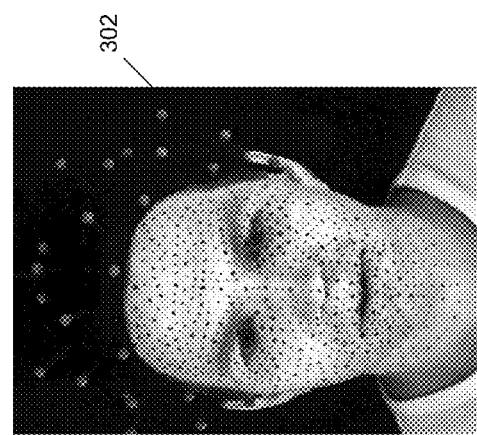
FIG. 3A-D includes a shape mesh, an image, a motion mesh overlaying the image and the motion mesh.

Referring to FIG. 2, a series of images 200*a-e* respectively captured by cameras 102*a-e* are illustrated. By temporally synchronizing the cameras 102*a-e*, corresponding images may be captured during the same time instance. For example, each of the images labeled "T=1" may have been captured at the same time. The images 200*a-e* are provided to the computer system 112 for processing by the shape mesh generator 116, the motion mesh generator 118, the animation mesh generator 120 and the motion transferor 122. For processing, the content of the images captured at the same time instance may be combined. For example, the shape mesh generator 116 may use stereo reconstruction (or other similar methodology) to construct a 3D shape mesh 202 for each time instance from the corresponding captured images. Generally each shape mesh has a relatively high resolution and provides a detailed representation of the shape of the captured object (e.g., the actor's face 104). As shown in FIG. 3A, an exemplary shape mesh 300 illustrates the shape (e.g., an actor's facial expression) produced from images (e.g., images 110*a-e*) captured at the same time instant. While large in number, the vertices of the shape mesh 300 may not be distinguishable (compared to the markers) and may not be quantified by a coordinate system. As such, the motion of individual vertices may not be tracked from one shape mesh (e.g., T=1 shape mesh) to the next sequential shape meshes (e.g., T=2 shape mesh, ..., T=n shape mesh).

Figure 3B:

Returning to FIG. 2, along with producing shape meshes, motion meshes may be produced from the content of the images 200*a-e* to track marker motion. As shown in FIG. 3B, a high resolution image 302 illustrates the content (e.g., an actor's facial expression) of one high resolution image (e.g., 200*a*) at one time instance (e.g., T=1). Along with showing the markers (e.g., makeup dots) applied on the actor's face (that contrast with the actor's skin tone), the high-resolution image 302 also shows the markers (e.g., white balls) applied to the top of the actor's head that contrast with the color of the actor's hair.

Each captured high resolution image may contain similar content for different perspectives and for different time instants. Sequentially viewing these high resolution images, the shape of the actor's face may change as he changed his facial expression over the image capture period. Correspondingly, the markers applied to the actor's face may change position with the changing facial expressions. By determining the position of each marker in space (e.g., according to coordinate system 108), a three dimensional motion mesh 204 may be produced that represents the marker positions in 3D space. To track marker motion over time, additional motion meshes 204 are produced (for each capture time instance) from the content the corresponding high resolution images. As such, marker position changes may be tracked from one motion mesh to the next. The positions or position changes of the markers (for each capture time instance) may also be entered and stored in a data file or other similar structure. Other types of data from the images 200*a-e* may be used for producing motion meshes 204. For example, the content of the shape meshes 202 may be used for motion mesh production. By producing motion meshes for these time instances or a data file that stores marker positions, a quantitative measure of the marker position changes is provided as the actor changes his facial expression.

Figure 3C:
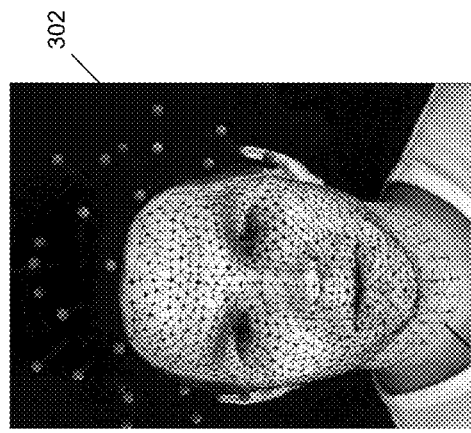
Figure 3D:
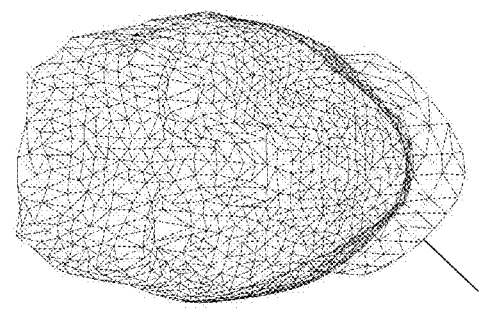

In this implementation, to generate a motion mesh from the images 200*a-e*, the motion mesh generator 118 determines the position of each marker in three dimensional space and the positions of the cameras 102*a-e*. Each marker position is assigned to a vertex, which in combination form facets of a motion mesh. In some arrangements, the position determination is provided as described in U.S. patent application Ser. No. 11/384,211 (published as United States Patent Application Publication 2006/0228101), herein incorporated by reference. Referring to FIG. 3C, a motion mesh 304 is presented overlaying the image 302 (shown in FIG. 3B). The vertices of the motion mesh 304 are assigned the respective positions of the markers applied to the actor's face and interconnect to adjacent vertices to form triangular facets. Referring to FIG. 3D, the motion mesh 304 is shown absent the high resolution image 302. As is apparent, the resolution of the motion mesh 304 is relatively low and the actor's face is not generally recognizable. However, by correlating the vertices with the positions of the markers in subsequent high resolution images, the position of the vertices may be tracked over time and thereby allow motion tracking of the actor's facial expressions. Furthermore, by quantifying the positions of the vertices over time, the associated motion information may be used to transfer the actor's facial expressions to an animated character or other type of computer-generated object.

As mentioned, while the vertices of the motion mesh 304 allow tracking of the motion of the actor's face, the relatively low resolution of the motion mesh does not provide a recognizable face. To improve resolution, some conventional methodologies increase the number of markers applied to the actor's face, thereby increasing the number of motion mesh vertices and mesh resolution. However, additional markers require more of the actor's time for application along with additional processing and storage space to generate and store the motion mesh. Furthermore, optimal lighting conditions may be needed to resolve the closely position markers. Thus, image capture may need to be confined to a controlled lighting environment such as a studio and not be applicable in low light environments or naturally lit environments (e.g., outside).

Rather than capture more marker information, a relatively high resolution animation mesh may be produced and receive motion information transferred from the low resolution motion meshes 204. Furthermore, the high resolution shape information contained in the shape meshes 202 may be used to transfer motion from the lower resolution motion meshes 204. Thus the animation mesh is driven by motion information provided from the motion meshes 204 (as influenced by the shape meshes 202).

In this implementation of the motion capture system 100, an animation mesh 206 is produced by the animation mesh generator 120 from the content of one or more of the images 200a-e. However, the animation mesh 206 may be produced by other methodologies. For example, a graphic artist may generate the animation mesh 206 from one or more of the images 200a-e by applying a high resolution grid. Graphical software packages may also be used by the graphic artist or in conjuncture with the animation mesh generator 120 to generate the animation mesh 206.

To provide motion to the animation mesh 206, motion information associated with the motion meshes 204 is transferred to the animation mesh. Thereby, the animation mesh 206 provides a high resolution representation of the actor's face and incorporates the movement of the motion meshes 204. Additionally, the shape information provided by one or more of the shape meshes 202 may be used to influence the motion information provided by the motion meshes 204. For example, the shape information may constrain the application of the motion information to the animation mesh 206.

Referring to FIG. 4A, an animation mesh 400 is shown overlaying the image 302 (also shown in FIG. 3B). As is apparent from the figure, the animation mesh 400 includes a grid that conforms to the shape of the actor's face depicted in the image 302. In some instances, a graphic artist may use visual interpolation to select grid vertices or to include additional grid vertices in the animation mesh 400. Additionally, the artist (or the animation mesh generator 120) may select more points in particular facial regions (e.g., the corner of the mouth) that may need finer resolution to properly represent a feature of the actor's face. Vertices may also be more uniformly distributed across facial regions (e.g., the forehead) where less detail is needed. Generally, more vertices are included in the animation mesh 400 compared to the motion mesh 304 and provide finer detail. For example, the curvature of the actor's nose is more pronounced in the animation mesh 400 compared to shape provided by the markers represented in the motion mesh 304 as shown in FIG. 3D.

Some vertices of the animation mesh 400 may have positions equivalent to vertices included in the motion mesh 304, however, since the animation mesh has more vertices, some of the animation mesh vertices may not map to the same positions as the motion mesh vertices. Some of the animation mesh 400 vertices may similarly map to vertices of the shape mesh 300 (shown in FIG. 3A).

In some implementations, along with one or more of the images 200a-e, other graphical information may be used to generate the animation mesh 206. For example, one or more of the shape meshes 202, the motion meshes 204, or multiple meshes may overlay one of the images 200a-e. From these overlaid images, the artist (or the animation mesh generator 120) may select vertices to provide a detailed representation of the actor's face.

Referring to FIG. 4B, the animation mesh 400 is shown absent the image 302 in the background. The animation mesh 400 provides a more detailed representation of the actor's face compared to the motion mesh 304 while being somewhat similar in resolution to the shape mesh 300. The animation mesh 400 includes vertices such that features of the actor's eyes, mouth and ears are clearly represented. The motion information associated with motion meshes (along with the shape information of shape meshes) may be used to change the positions of the vertices included in the animation mesh 400 and thereby provide animation. Motion information may also be transferred to other types of surface structures that define the animation mesh 400. For example, curved structures, patches, and other surface structures may be moved independently or in combination with one or more vertices. The surface structures may also define particular portions of a face, for example, one or more curved surface structures may be used to represent a portion of a lip and one or more patch surface structures may represent a portion of a cheek, forehead, or other portion of an actor's face.

Figure 5:
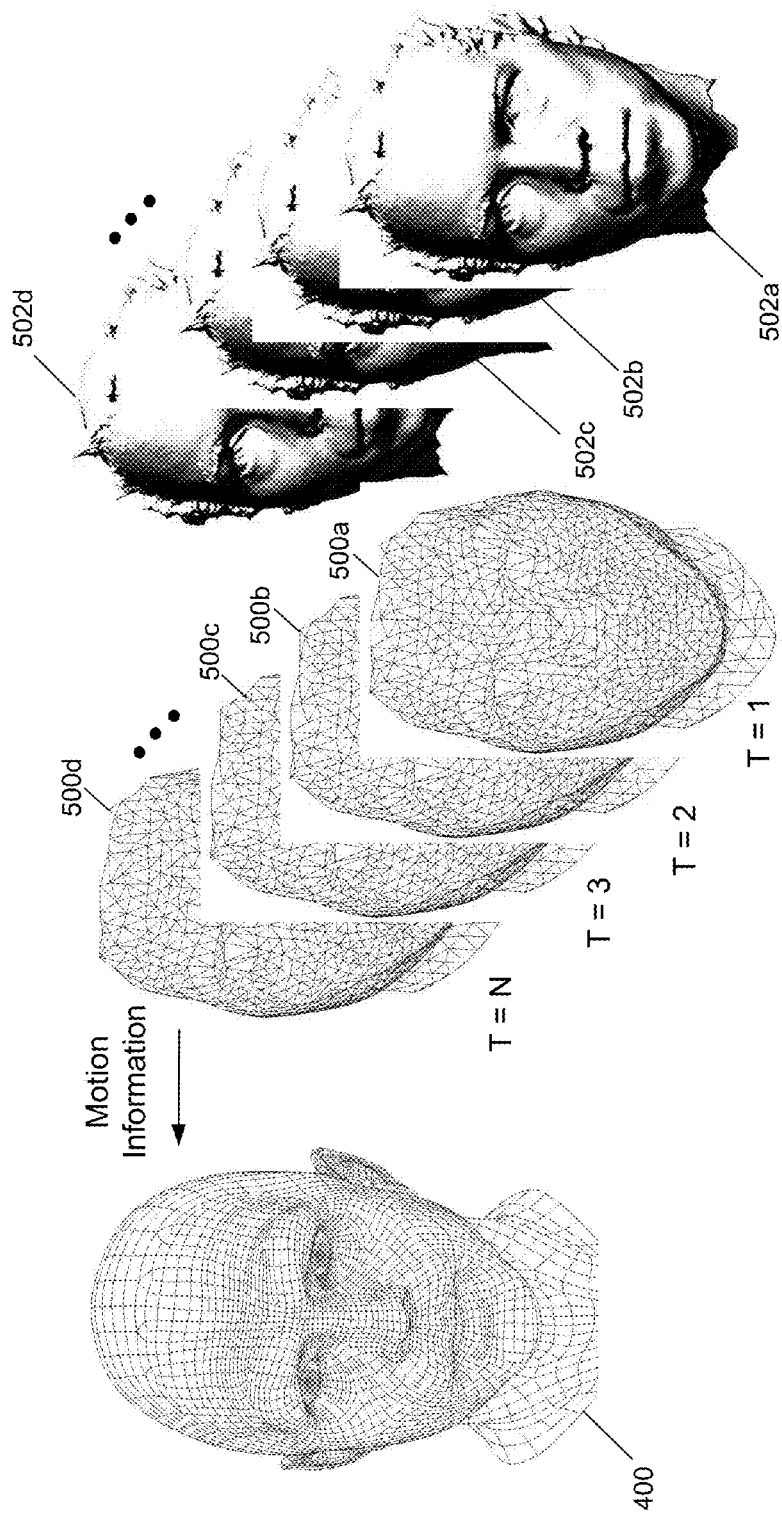
FIG. 5 is a diagram that illustrates transferring the motion information of motion meshes to an animation mesh using shape meshes.

Returning to FIG. 2, the motion transferor 122 includes a motion linker 208 that transfers the motion information of the motion meshes 204 to the animation mesh 206. Additionally, the motion linker 210 may use shape information from the shape meshes 202 to transfer the motion information to the animation mesh 206. In this example, the motion is transferred to a single animation mesh, however, in some implementations the motion may be transferred to multiple animation meshes. As illustrated in FIG. 5, the motion information associated with a sequence of motion meshes 500a-d is transferred to the animation mesh 400. Additionally, a corresponding sequence of shape meshes 502a-d provide shape information that may be used in the motion transfer. To transfer the motion, the position of each vertex may be mapped from the motion meshes 500a-d to the animation mesh 400. For example, the position of each vertex included in motion mesh 500a (and associated with time T=1) may be transferred to appropriate vertices included in the animation mesh 400. Sequentially, the vertex positions may then be transferred from motion meshes 500b, 500c and 500d (for times T=2, 3 and N) to animate the animation mesh 400.

Besides transferring data that represents the position of the vertices of the motion meshes 500a-d, other types of motion information may be transferred. For example, data that represents the change in the vertices positions over time may be provided to the animation mesh 400. As vertex positions sequentially change from one motion mesh (e.g., motion mesh 500a) to the next motion mesh (e.g., motion mesh 500b), the difference in position may be provided to animate the animation mesh 400. Encoding and compression techniques may also be implemented to efficiently transfer the motion information. Furthermore, rather than providing the motion information directly from each of the motion meshes 500a-d, a file containing data, which represents the motion information (e.g., vertex positions, change in vertex positions, etc.), may be used by the motion linker 208 to transfer the motion information to the animation mesh 400.

Position changes of vertices of the motion meshes 500a-d may be directly mapped to equivalent vertices of the animation mesh 400. For example, if a vertex included in the animation mesh 400 has a location equivalent to a vertex in the motion meshes 500*a-d*, the motion associated with the motion mesh vertex may be directly transferred to the animation mesh vertex. However, in some scenarios, one or more of the motion mesh vertices may not have equivalent vertices in the animation mesh 400. The motion of the motion mesh vertices may still influence the motion of the animation mesh vertices in such situations. For example, motion mesh vertices may influence the motion of proximately located animation meshes vertices.

Additionally, the shape meshes 500*a-d* may influence the motion information being transferred to the animation mesh 400. For example, shape information (contained in the shape mesh 502*a*) may constrain the movement range of one or more vertices of the animation mesh 400. As such, while a motion mesh (e.g., motion mesh 500*a*) may transfer a vertex position (or position change) to a vertex of the animation mesh 400, a corresponding portion of a shape (of the shape mesh 502*a*) may limit the position or position change. Thereby, the transferred motion may not be allowed to significantly deviate from the shape provided by the shape mesh 502*a*. Shape changes (e.g., across the sequence of shape meshes 502*b-d*) may similarly constrain the motion information transferred from corresponding motion meshes (e.g., motion meshes 500*b-d*).

Figure 6A:
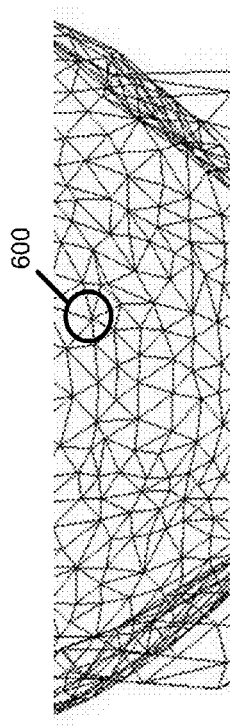
FIG. 6A-C include a portion of a motion mesh, a portion of an animation mesh and a portion of a shape mesh.

Referring to FIG. 6A, a portion of the motion mesh 500*a* that represents the actor's mouth is illustrated. A vertex, highlighted by a ring 600, is located near the three-dimensional space in which the upper lip of the actor's mouth is represented. The vertex is also included in each of the motion meshes 500*b,c,d* that sequentially follow the motion mesh 500*a*. In one or more of the motion meshes, the position of the vertex may change to represent motion of the actor's upper lip. For example, the vertex may translate along one or more of the coordinate system 108 axes (e.g., X-axis, Y-axis, Z-axis).

Figure 6B:
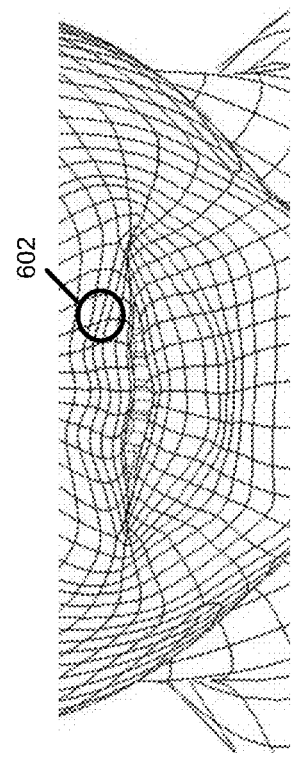

Referring to FIG. 6B, a portion of the animation mesh 400 that correspondingly represents the actor's mouth is illustrated. The equivalent location of the vertex (highlighted by the ring 600 in FIG. 6A) is highlighted by a ring 602 in the mesh. As the figure illustrates, the animation mesh includes multiple vertices within the ring 602 (compared to the single vertex included in the ring 600). Furthermore, none of the multiple vertices appear to be located in a position that is equivalent to the position of the vertex in the ring 600. As such, the motion of the motion mesh vertex (highlighted by the ring 600) may not directly map to the vertices (highlighted by the ring 602) in the animation mesh. However, the motion of the single vertex within the ring 600 may influence the motion of the multiple vertices within the ring 602. One or more techniques may be implemented to quantify the influence of the motion mesh vertex and determine the corresponding motion of the animation mesh vertices. For example, one or more adjacent vertices and the vertex (in the ring 600) may be interpolated (e.g., using linear interpolation, non-linear interpolation, etc.) to identify additional points. These interpolated points may be compared to the vertices included in the ring 602 for potentially selecting a point that may map to an appropriate animation mesh vertex. As such, the shape of the animation mesh may constrain which vertices or interpolated points of the motion mesh may be used to provide motion information. In the situation in which the location of an interpolated point matches the location of an animation mesh vertex, motion of the point (across a sequence of motion meshes) may be transferred to the animation mesh vertex. In scenarios absent a direct location match between a motion mesh vertex (or interpolated point) and an animation mesh vertex, one or more data fitting techniques (e.g., linear fitting, curve fitting, least squares approximation, averaging, etc.) may be applied in addition (or not) to other mathematic techniques (e.g., applying weighting factors, combining data values, etc.) to transfer motion.

Along with local motion mesh vertices (e.g., adjacent vertices) influencing the motion transferred to one or more animation mesh vertices, in some arrangements the influence of one or more remotely located motion mesh vertices may be used. For example, along with using vertices adjacent to the vertex within the ring 600, one or more vertices located more distance from this vertex may be used for interpolating additional motion mesh points. As such, the remotely located vertices may provide influences that produce correlated facial expressions that extend across broad portions of the actor's face. Alternatively, vertex influence may be reduced or removed. For example, the movement of some vertices may not significantly influence the movement of other vertices, even vertices proximate in location. Referring again to the actor's mouth, the upper lip and the lower lip may be considered proximately located. However, the movement of the upper lip may be independent of the movement of the lower lip. For example, if the upper lip moves upward, the lower lip may remain still of even move downward (as the actor's mouth is opened). Thus, in some situations, the movement of the lower lip is not influenced by the movement of the upper lip or vice versa. To dampen or isolate such an influence, the lower lip vertex positions of the animation mesh may be determined from the lower lip vertex positions of the motion mesh and independent of the upper lip vertex positions of the motion mesh. Similarly, upper lip vertex positions of the animation mesh may be determined independent of the lower lip positions of the motion mesh. Such vertex independence may be initiated by the motion transferor 122, by another process (e.g., the motion mesh generator 118) or by a user (e.g., a graphical artist) interacting with the motion meshes and animation mesh.

Figure 6C:
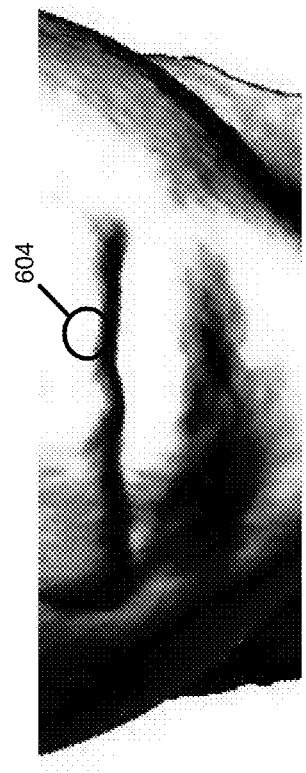

Referring to FIG. 6C, a portion of the shape mesh 502*a* that corresponds to the actor's mouth is illustrated. The equivalent location of the vertex (highlighted by the ring 600 in FIG. 6A) and the vertices (highlighted by the ring 602 in FIG. 6B) is highlighted by a ring 604 in the shape mesh portion. As the figure illustrates, one or more shapes are included within the ring 604. As mentioned above, the shape(s) may be used to influence the motion transfer. For example, the shapes included in the ring 604 may define a range that limits the motion transferred to the vertices in the ring 602. As such, motion transferred to the vertices within the ring 602 may be constrained from significantly deviating from shapes in the ring 604. Similar shapes in the sequence of shape meshes 502*b-d* may correspondingly constrain the transfer of motion information from respective motion meshes 500*b-d*.

In some situations, a shape mesh may include gaps that represent an absence of shape information. As such, the shape mesh may only be used to transfer motion information corresponding to locations in which shape information is present. For the locations absent shape information, motion information from one or more motion meshes may be transferred using shape information from the animation mesh. For example, the current shape or a previous shape of the animation mesh (for one or more locations of interest) may be used to provide shape information.

Other motion tracking techniques may also be used for motion transfer. For example, rather than tracking the motion of one or more distinct vertices, movement of facial features such as the curve of a lip or an eyebrow may be tracked for motion information. As such, shapes included in the actor's face may be tracked. For example, an expansive patch of facial area may tracked to provide the motion of the facial patch. Furthermore, along with tracking distinct artificial points (e.g., applied markers) and/or natural points (e.g., facial texture, facial features, etc.), distribution of points may be tracked for motion information. For example, motion information from a collection of points (e.g., artificial points, natural points, a combination of natural and artificial points, etc.) may be processed (e.g., calculate average, calculate variance, etc.) to determine one or more numerical values to represent the motion of the distributed points. As such, the individual influence of one or more points included in the point collection can vary without significantly affecting the motion information of the distributed points as a whole. For example, a single natural or artificial point may optically fade in and out over a series of captured images. However, by including this single point in a distribution of points, a large motion variation (due to the fading in and out by this single point) may be reduced on average. In some implementations, this technique or similar techniques (e.g., optical flow) may be used in combination with tracking motion information from distinct points (e.g., artificial points, natural points).

Referring back to FIG. 2, after the motion information is transferred to the animation mesh 206, in this implementation, the animation mesh 206 is provided to a renderer 210 that renders an animated image and, for example, provides the rendered animated image to a display device (e.g., a computer monitor, etc.). In one implementation the renderer 210 is executed by the computer system 112. Referring to FIG. 4C, an exemplary rendered image 402 produced by the renderer 210 from the animation mesh 206 is presented.

The motion transferor 122 also includes a decomposer 212 that decomposes the motion information for storage in the motion library 124. Various types of decomposition techniques (e.g., Karhunen-Loeve (KL), etc.) may be implemented that use one or more mathematical analysis techniques (e.g., Fourier analysis, wavelet analysis, etc.). For example, a Principle Component Analysis (PCA) may be executed by the decomposer 212 to decompose a portion or all of the motion information into principle components. Along with decomposition, by computing the principle components, noise artifacts may be removed from the movement information. For example, noise introduced by the motion information may be substantially removed. For example, visually detectable jitter may be introduced into the individual facets of the animation mesh by the motion information. By computing the principle components, normal vectors associated with each of the mesh facets may be re-aligned and thereby reduce the visual jitter.

Once calculated, the principle components (or other type of decomposition data) may be stored in the motion library 124 (on storage device 114) for retrieval at a later time. For example, the principle components may be retrieved to generate an animation mesh that represents one or more of the facial expressions originally captured by the cameras 102a-e. The principle components may also be combined with other principle components (e.g., stored in the motion library 124) by the motion transferor 122 (or other process) to produce animation meshes for other facial expressions that may be rendered by the renderer 210 for application on an animated character or other type of object.

Figure 7:
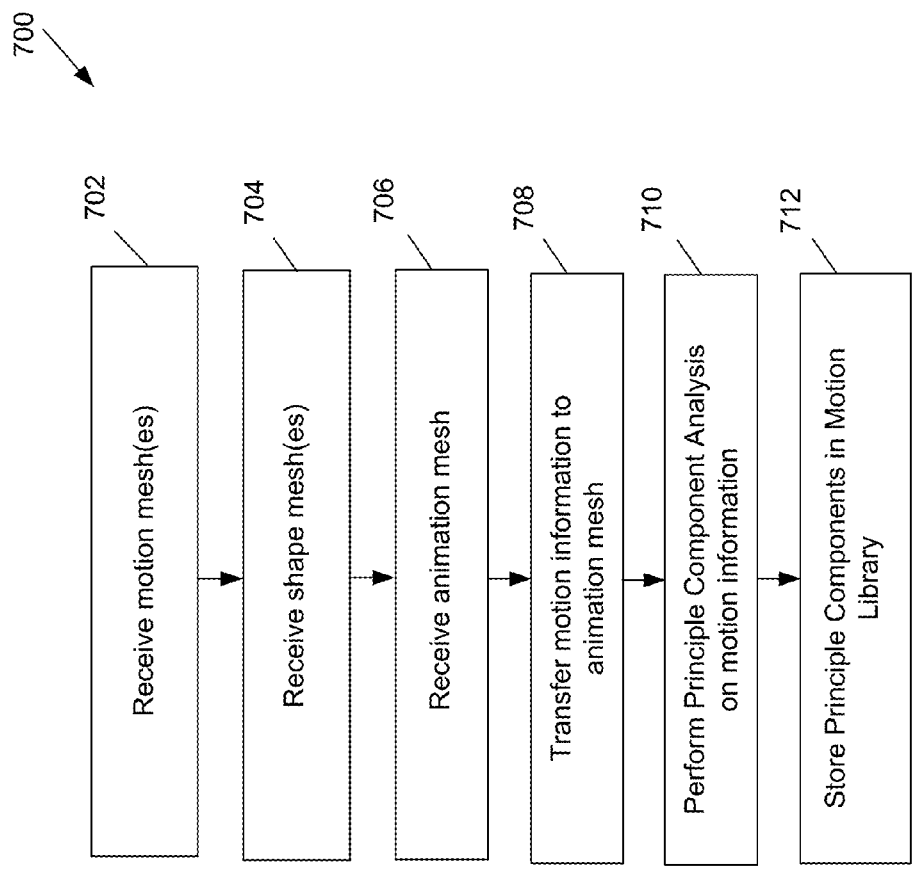
FIG. 7 is a flow chart of operations executed by a motion transferor.

Referring to FIG. 7, a flowchart 700 that represents some of the operations of the motion transferor 122 is shown. As mentioned above, the motion transferor 122 may be executed by a computer system (e.g., computer system 112) or multiple computing devices. Along with being executed at a single site (e.g., at one computer system), operation execution may be distributed among two or more sites.

Operations of the motion transferor 122 include receiving 702 one or more motion meshes (e.g., from the motion mesh generator 118). Operations also include receiving 704 one or more shape meshes and receiving 706 at least one animation mesh. Typically, the motion mesh (or meshes) have a lower resolution than the animation mesh since the vertices of the motion mesh are defined by the visual representation of artificial points (e.g., markers) applied to a deformable object (e.g., an actor's face) included in the captured images. As mentioned, natural points (e.g., facial texture, facial features, etc.) may be used to define the vertices or other types of tracking points or features. Operations also include transferring 708 the motion information (provided by the motion meshes) to the animation mesh. As mentioned above, the shape meshes may influence (e.g., constrain) the transfer for the motion information. Thereby, motion representing e.g., facial expressions, are applied to a high-resolution animation mesh. Other operations may also be performed on the motion information. For example, the motion transferor 122 may perform 710 Principle Component Analysis or other type of decomposition on the motion information to generate principle components. Once computed, the principle components may be stored 712 for retrieval at a later time for individual use or in combination with other principle components or other types of data (e.g., weighting factors, etc.). For example, the stored principle components may be used with an animation mesh to generate one or more facial expressions captured from the actor's face. The stored principle components may also be used to generate non-captured facial expressions by being further processed (e.g., weighted, combined, etc.) with or without other principle components.

By collecting images of facial expressions and decomposing motion information associated with the expressions, a model may be produced that allows each expression (or similar expressions) to be reconstructed. For example, principal components (produced from motion information) may be retrieved and applied with weights (e.g., numerical values) for facial expression reconstruction. The motion models may be produced for one or more applications. For example, one motion model may be produced for reconstructing an actor's facial expressions for a particular performance. Other motion models may represent other performances of the actor or other actors. Performances may include the actor's participation in a particular project (e.g., movie, television show, commercial, etc.), or playing a particular role (e.g., a character) or other similar type of event.

Image capturing for creating motion models may also occur during a single session or over multiple separate sessions. For example, images of an actor (e.g., facial expressions) may be captured during one time period (e.g., session one), then, at a later time, the actor may return for another session (e.g., session two) for capturing additional images. In the future, additional sessions may be held for capturing even more images of the actor. However, while the same actor may be present for each session, the actor's appearance may not be consistent. For example, make-up applied to the actor may not have the same appearance (to previous sessions) or marker locations may not be equivalent from one session to the next. Furthermore, image capture conditions may not be consistent from between sessions. For example, lighting conditions may change from one image capture session to the next.

By combining content captured during multiple sessions, an actor is not constrained to attend one image collection session (which may take a considerable amount of time) but rather break up his performance across multiple sessions. Furthermore, by comparing content captured during multiple sessions, content may be aligned (e.g., shifted, rotated, scaled, etc.) to substantially remove any offset. For example, images of actors with inconsistent makeup (or other features) or captured under different conditions (e.g., lighting) may be aligned. As such, dissimilar content from multiple sessions may be aligned and combined to appear as if captured during a single session.

Figure 8:
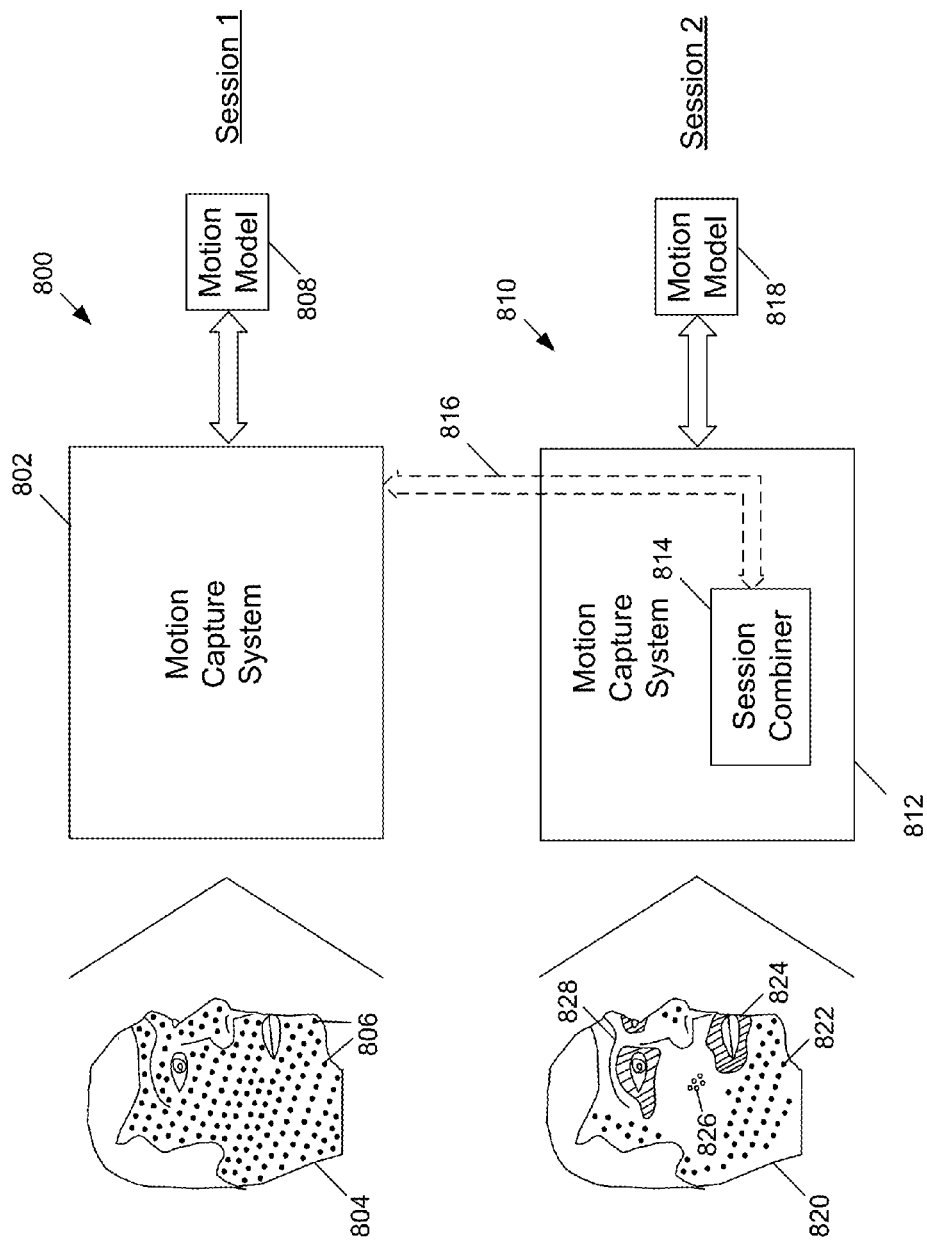
FIG. 8 is a diagram that illustrates motion information being captured over two sessions.

Referring to FIG. 8, two image capture sessions are illustrated to represent collecting images of an actor's facial expressions during multiple sessions. Along with occurring at different times, the two sessions may occur at difference locations. For example, during a first session 800, a motion capture system 802 collects a series of images of an actor's face 804 in a manner similar to the motion capture system 100 (shown in FIG. 1). Markers 806 are applied to the actor's face 804 in a similar manner as illustrated in FIG. 1. From the collected images, the motion capture system 802 produces a motion model 808 that may be used to animate the captured facial expressions or create new expressions. Rather than the markers 806, and as mentioned above, other types of surface features may be used to track the facial expressions. For example, other types of artificial surface features (e.g., makeup, etc.), or nature surface features (e.g., facial contours, moles, dimples, eyes, blemishes, etc.) or a combination of artificial and natural surface features may be used to track facial expressions.

Similar to the first session 800, during a second session 810 a motion capture system 812 (which may or may not be similar to motion capture system 802) captures images of an actor's face 820 (typically the same actor captured in the first session). In some arrangements, motion capture system 812 is equivalent to (or distinct and separate from) the motion capture system 802 and is used at a later time (and possibly at another location). To combine the content captured during the first session 800 with content captured during the second session 810, a session combiner 814 is included in the motion capture system 812. Typically, the session combiner 814 includes one or mores processes (e.g., an application, subroutine, etc.) that may be executed by a computer system (such as computer system 112) or one or more other types of computing devices.

To combine the session content, the session combiner 814 has access to the content captured during each session (e.g., the first session 800, the second session 810, etc.). For example, captured images or processed data (e.g., motion model 808) may be accessible by the session combiner 814 (as represented by the dashed, doubled-sided arrow 816). Once collected, the content from the two (or more) sessions may be aligned and combined by the session combiner 814 and processed to produce a new or updated motion model 818 that may be used for reconstructing facial expressions captured during either session.

Since image capture sessions typically occur at different times (and possibly different locations), surface features of the actor's face may not be consistent across sessions. As illustrated, the appearance of the actor's face 820 may be drastically different compared to the actor's face 804 during the first image capture session. Due to the difference in appearance, the session combiner 814 compares and aligns the content from each session prior to combining the content to produce the updated motion model 818. In some arrangements, surface features in images captured in the first session may be compared to surface features of images captured in the second session. For example, artificial surface features (e.g., markers) represented in images of the actor's face 804 may be compared to artificial or nature surface features in images of the actor's face 820. By correlating the markers 106 (of the actor's face 804) with markers 822, patches of makeup 824, blemishes 826, contours 828 or other surface features (of the actor's face 820), the session combiner 814 may align and combine the content of the two sessions for producing the updated motion model 818.

Figure 9:
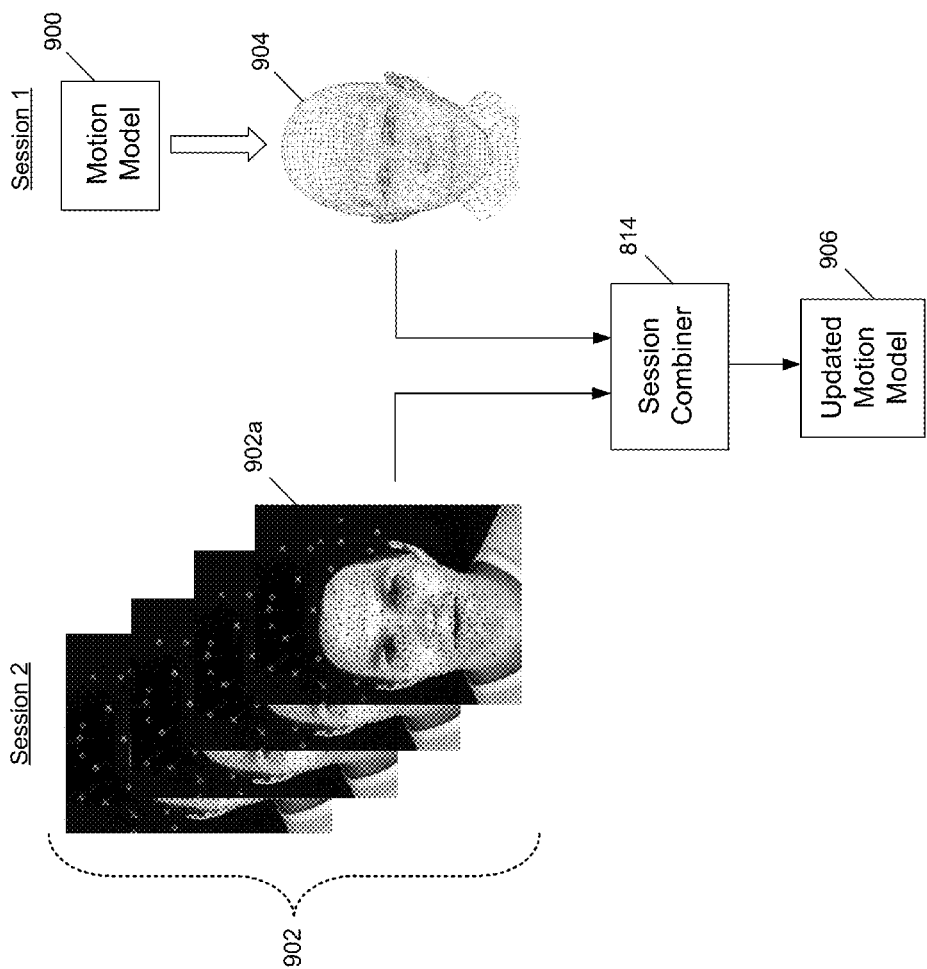
FIG. 9 is a diagram that illustrates combining motion information captured over two sessions.

Referring to FIG. 9, an example of combining content from two different sessions is illustrated. Content from a first session is represented by a motion model 900 that may be produced from images captured during the first session. In this illustration, the motion model 900 represents facial expressions of an actor captured in a series of images. During a second session, another series of images 902 are captured. While the same actor is the subject of the images, the surface features of the actor's face may be different compared to the facial surface features captured and used to produce the motion model 900.

To combine the content from each session, the session combiner 814 compares the content of the images 902 and the content of the animation mesh 904. For example, the session combiner 814 may identify one image 902a (included in the images 902) that illustrates a facial expression similar to the facial expression of the animation mesh 904. One or more techniques may be used to identify the image 902a. For example, the facial expression of the animation mesh 904 may be spatially correlated with the facial expression of each of the images 902 to identify common surface features. The image (e.g., image 902a) with the highest correlation with the animation mesh may be selected. The identified image 902a may be used for calibrating the content from either or both sessions such that the content aligns.

In one example, an offset that represents the spatial differences (e.g., linear difference, rotational difference, etc.) between surface features of the identified image 902a and corresponding surface features of the animation mesh 904 may be computed by the session combiner 814. The surface features may or may not be represented similarly in the identified image 902a and the animation mesh 904. For example, makers may have been used to represent surface features in the images used to produce the session one motion model 900 while facial contours and skin texture are used to represent surface features in image 902a. An offset may be determined (by the session combiner 814) by computing location and orientation differences between these surface features of the identified image 902a and the animation mesh 904. For situations in which surface feature locations are not represented by 3D coordinates, other techniques and methodologies may be used to represent the position of surface features. For example, ray tracing techniques may be used determine relative location information that may be used to compute an offset.

Upon identification, an offset may be used by the session combiner 814 to calibrate content from either of both capture sessions. For example, the offset may be applied to each of the images 902 to align their content with the content of motion model 900. Alternatively, the content of the motion model 900 may adjusted by the offset (or a representation of the offset) for aligning with the content of the images 902. In still another scenario, the offset may be applied to content from both sessions. By aligning the contents of the images 902 and the motion model 900, the content of both sessions may be calibrated for a common orientation and may be considered as being captured during a single session.

To appear as being content from one session, the session combiner 814 may further process the calibrated content, such as by combining the content using one or more techniques. Once combined, the content may be further processed. For example, an updated motion model 906 may be produced from the combined content of the images 902 and the motion model 900 that represents the content of both sessions. The updated motion model 906 may be used to produce facial expressions captured in the images 902 and the expressions used to produce motion model 900 (along with other expressions). One or more techniques may be used to produce the updated motion model 906. For example, the session combiner 814 may linearly transform the combined content such as by performing PCA to characterize the facial expressions (e.g., determine principal components) and to reduce data dimensionality. As mentioned above, weighting factors may be applied to the computed principal components to reconstruct the facial expressions (from both sessions).

In this illustration, a series of images and a motion model were used to compare contents captured during of two different sessions. However, in other arrangements, session content may be represented in other formats and used for comparing, aligning, and combining with other session content. For example, rather than image content, the content of the images 902 may used to produce shape meshes, motion meshes, animation meshes, or other content representations. Similarly, rather then applying the motion model 900 content to an animation mesh for comparing with content collect during a second session, the content may be incorporated into one more images, motion meshes, shapes meshes or other type of representation. As such content comparison and combining may be executed in image space, mesh space (e.g., motion meshes, shape meshes, animation meshes, etc.) or with linearly transformed content (e.g., decomposed content, principal components, etc.).

Figure 10:
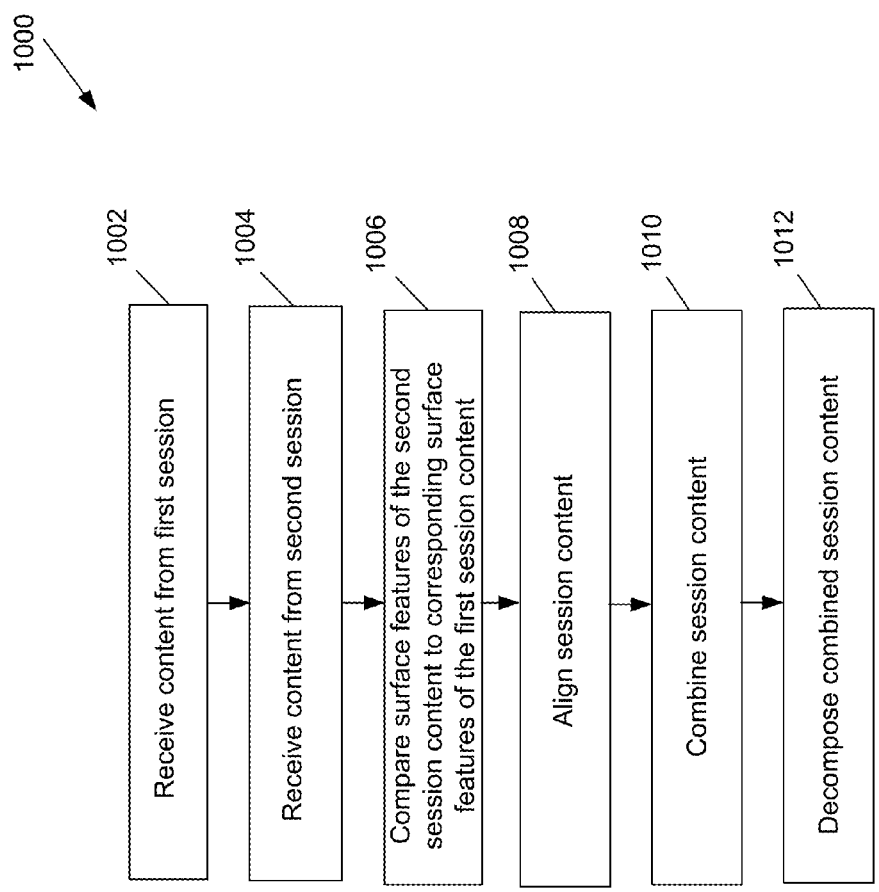
FIG. 10 is a flow chart of operations of a session combiner.

Referring to FIG. 10, a flowchart 1000 represents some of the operations of the session combiner 814. The operations may be executed by a single computer system (e.g., computer system 112) or multiple computing devices. Along with being executed at a single site (e.g., at one computer system), operation execution may be distributed among two or more sites.

Operations include receiving 1002 content captured during a first motion capture session. For example, this content may include a motion model produced from images captured during the first session. Operations also include receiving 1004 content captured during a second session. In some arrangements the content received during the second session is similar to the content captured during the first session. For example, facial expressions associated with a particular performance of an actor may be captured during the first session. Captured images of these facial expressions may be used to produce a motion model animating the actor's performance. During the second session, additional or similar facial expression may be captured that are also associated with the actor's performance.

Operations also include comparing 1006 common features represented in the content of both sessions. For example, artificial or natural surface features may be identified in both sets of captured session content. As mentioned, different types of surface features may be correlated between the sessions. For example, facial markers represented in the content captured during the first session may correlate to other types of artificial surface features (e.g., makeup patches) or natural surface features (e.g., eye or lip contours, skin texture, etc.) represented in the second session content. By comparing the surface features between the sessions, one or more calibration values may be determined. For example, one or more offsets (e.g., position offset, angular offset, etc.) may be computed by comparing surface features, and used to align one or both sets of session content. In some arrangements, particular content (e.g., an image) from one session that best correlates with content from another session is used to compute the offset(s).

Operations also include aligning 1008 the session content so that the content from the two sessions may be merged and appear to be collected during one session. For example, one or more offsets may used to align (e.g., shift, rotate, scale, etc.) content (e.g., an image) from the first session with the content from the second session. Similar or different offsets may be applied to the content of one session, either session, or to content of both sessions for alignment.

Operations also include combining 1010 the aligned session content. For example, aligned content from the first session may be combined with content from the second session or aligned content of the second session may be combined with the first session content. One or more techniques may be implemented for combining the session content. For example, the three-dimensional location of surface features may be calculated (e.g., from numerical coordinates, ray tracing, etc.) and used to combine content of the two sessions such that the content appears to have been collected during a single session. In some arrangements, content from additional sessions may combined with the first and second session content.

Upon combining the content from the two or more sessions, operations of the session combiner 814 include decomposing 1012 the combined session content. As mentioned above, the one or more linear transformations may be applied to the combined session content. For example, PCA may be performed on the combined session content for computing principal components. Since the components are computed using the additional session content (compared to principal components computed from just the first session content), a motion model may updated or modified to include the newly computed components.

To perform the operations described in flow chart 1000, session combiner 814 (shown in FIG. 8) may perform any of the computer-implement methods described previously, according to one implementation. For example, a computer system such as computer system 112 (shown in FIG. 1) may execute the session combiner 814. The computer system may include a processor (not shown), a memory (not shown), a storage device (e.g., storage device 114), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the computer system. In one implementation, the memory is a computer-readable medium. In one implementation, the memory is a volatile memory unit. In another implementation, the memory is a non-volatile memory unit.

The storage device is capable of providing mass storage for the computer system. In one implementation, the storage device is a computer-readable medium. In various different implementations, the storage device may be a floppy disk device, a hard disk device, an optical disk device, or a tape device.

The input/output device provides input/output operations for the computer system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method comprising:
comparing, by a processor, a first representation produced from content captured during a first motion image capture session, wherein the first representation comprises a motion model of an object and an animation mesh of the object, and a second representation produced from content captured during a second motion image capture session, different from the first motion image capture session, wherein the second representation comprises data of each of a plurality of images captured during the second motion image capture session and a representation of the object, and wherein the comparison is between the animation mesh and the data of the plurality of images;
determining, using the comparison, a correspondence between a surface feature of the object represented in the animation mesh of the first representation and a respective surface feature of the object in the data of the plurality of images of the second representation;
selecting, using the comparison and the correspondence, an image of the plurality of images having data with highest correlation to the animation mesh;
determining, using the comparison and the correspondence, an offset that represents a spatial difference between the surface feature of the object represented in the animation mesh of the first representation and the respective surface feature of the object in the data of the selected image;
applying the offset to the content of one of the first representation or the second representation;
substantially aligning the first and second representations using the correspondence between the surface feature of the object represented in the animation mesh of the first representation and the respective surface feature of the object in the data of the selected image; and
combining the aligned representations to produce a revised motion model capable of representing content of the first motion image capture session and the second motion image capture session.

2. The computer-implemented method of claim 1, wherein substantially aligning the first and second representations includes adjusting the second representation using the content of the first motion image capture session to align the surface feature of the object represented in the animation mesh of the first representation and the respective surface feature of the object in the data of the selected image.

3. The computer-implemented method of claim 1, wherein substantially aligning the first and second representations includes adjusting the first representation using the content of the second motion image capture session to align the surface feature of the object represented in the animation mesh of the first representation and the respective surface feature of the object in the data of the selected image.

4. The computer-implemented method of claim 1, further comprising:
decomposing motion information of the revised motion model of the combined representations.

5. The computer-implemented method of claim 4, wherein decomposing the combined representations includes linearly transforming the combined representations.

6. The computer-implemented method of claim 4, wherein decomposing the combined representations includes computing principle components.

7. The computer-implemented method of claim 1, wherein the data of at least one of the plurality of images captured during the second motion image capture session includes a motion mesh.

8. The computer-implemented method of claim 1, wherein the surface feature of the object represented in the animation mesh of the first representation includes an artificial surface feature.

9. The computer-implemented method of claim 1, wherein the surface feature of the object represented in the animation mesh of the first representation includes a natural surface feature.

10. The computer-implemented method of claim 1, wherein the surface feature of the object represented in the animation mesh of the first representation includes a marker on the object.

11. The computer-implemented method of claim 1, wherein the respective surface feature of the object in the data of the plurality of images of the second representation includes a contour on the object.

12. The computer-implemented method of claim 1, wherein the object is a deformable object.

13. The computer-implemented method of claim 1, wherein the object is an actor's face.

14. The computer-implemented method of claim 4, further comprising storing the decomposed motion information in a motion library.

15. A system comprising one or more computing devices configured to:
compare a first representation produced from content captured during a first motion image capture session, wherein the first representation comprises a motion model of an object and an animation mesh of the object, and a second representation produced from content captured during a second motion image capture session, different from the first motion image capture session, wherein the second representation comprises data of each of a plurality of images captured during the second motion image capture session and a representation of the object;
determine, using the comparison, a correspondence between a surface feature of the object represented in the animation mesh of the first representation and a respective surface feature of the object in the data of the plurality of images of the second representation;
select, using the comparison and the correspondence, an image of the plurality of images having data with highest correlation to the animation mesh;
determine, using the comparison and the correspondence, an offset that represents a spatial difference between the surface feature of the object represented in the animation mesh of the first representation and the respective surface feature of the object in the data of the selected image;
substantially align the first and second representations using the offset and the correspondence between the surface feature of the object represented in the animation mesh of the first representation and the respective surface feature of the object in the data of the selected image; and
combine the aligned representations to produce a revised motion model capable of representing content of the first motion image capture session and the second motion image capture session.

16. The system of claim 15, wherein substantially aligning the first and second representations includes adjusting the second representation using the content of the first motion image capture session to align the surface feature of the object represented in the animation mesh of the first representation and the respective surface feature of the object in the data of the selected image.

17. The system of claim 15, wherein substantially aligning the first and second representations includes adjusting the first representation using the content of the second motion image capture session to align the surface feature of the object represented in the animation mesh of the first representation and the respective surface feature of the object in the data of the selected image.

18. The system of claim 15, wherein the computing device is configured to decompose motion information of the revised motion model of the combined representations.

19. The system of claim 18, wherein decomposing the combined representations includes linearly transforming the combined representations.

20. The system of claim 18, wherein decomposing the combined representations includes computing principle components.

21. The system of claim 15, wherein data of at least one of the plurality of images captured during of the second motion image capture session includes a motion mesh.

22. The system of claim 15, wherein the surface feature of the object represented in the animation mesh of the first representation includes an artificial surface feature.

23. The system of claim 15, wherein the surface feature of the object represented in the animation mesh of the first representation includes a natural surface feature.

24. The system of claim 15, wherein the surface feature of the object represented in the animation mesh of the first representation includes a marker on the object.

25. The system of claim 15, wherein the respective surface feature of the object in the data of the plurality of images of the second representation includes a contour on the object.

26. The system of claim 15, wherein the object is a deformable object.

27. The system of claim 15, wherein the object is an actor's face.

28. The system of claim 18 wherein the computing device is configured to store the decomposed motion information in a motion library.

29. A computer program product tangibly embodied in a non-transitory storage device and comprising instructions that when executed by a processor perform a method comprising:
comparing a first representation produced from content captured during a first motion image capture session, wherein the first representation comprises a motion model of an object and an animation mesh of the object, and a second representation produced from content captured during a second motion image capture session, different from the first motion image capture session, wherein the second representation comprises data of each of a plurality of images captured during the second motion image capture session and a representation of the object;
determining, using the comparison, a correspondence between a surface feature of the object represented in the animation mesh of the first representation and a respective surface feature of the object in the second representation;

selecting, using the comparison and the correspondence, an image of the plurality of images having data with highest correlation to the animation mesh;

determining, using the comparison and the correspondence, an offset that represents the spatial difference between the surface feature of the object represented in the animation mesh of the first representation and the respective surface feature of the object in the data of the selected images;

substantially aligning the first and second representations using the offset and the correspondence between the surface feature of the object represented in the animation mesh of the first representation and the respective surface feature of the object in the data of the selected image; and combining the aligned representations to produce a revised motion model capable of representing content of the first motion image capture and the second motion image capture session.

30. The computer program product of claim 29, wherein substantially aligning the first and second representations includes adjusting the second representation using the content of the first motion image capture session to align the surface feature of the object represented in the animation mesh of the first representation and the respective surface feature of the object in the second representation.

31. The computer program product of claim 29, wherein substantially aligning the first and second representations includes adjusting the first representation using the content of the second motion image capture session to align the surface feature of the object represented in the animation mesh of the first representation and the respective surface feature of the object in the data of the selected image.

32. The computer program product of claim 29, further comprising instructions that when executed by a processor perform a method comprising:

decomposing motion information of the revised motion model of the combined representations.

33. The computer program product of claim 32, wherein decomposing the combined representations includes linearly transforming the combined representations.

34. The computer program product of claim 32, wherein decomposing the combined representations includes computing principle components.

35. The computer program product of claim 29, wherein the data of at least one of the plurality of images captured during the second motion image capture session includes a motion mesh.

36. The computer program product of claim 29, wherein the surface feature of the object represented in the animation mesh of the first representation includes an artificial surface feature.

37. The computer program product of claim 29, wherein the surface feature of the object represented in the animation mesh of the first representation includes a natural surface feature.

38. The computer program product of claim 29, wherein the surface feature of the object represented in the animation mesh of the first representation includes a marker on the object.

39. The computer program product of claim 29, wherein the respective surface feature of the object in the data of the plurality of images of the second representation includes a contour on the object.

40. The computer program product of claim 29, wherein the object is a deformable object.

41. The computer program product of claim 29, wherein the object is an actor's face.

42. The computer program product of claim 32, further comprising storing the decomposed motion information in a motion library.

* * * * *